INVENTOR.
JOHN PARSTORFER
BY
Samuel Kane
ATTORNEY

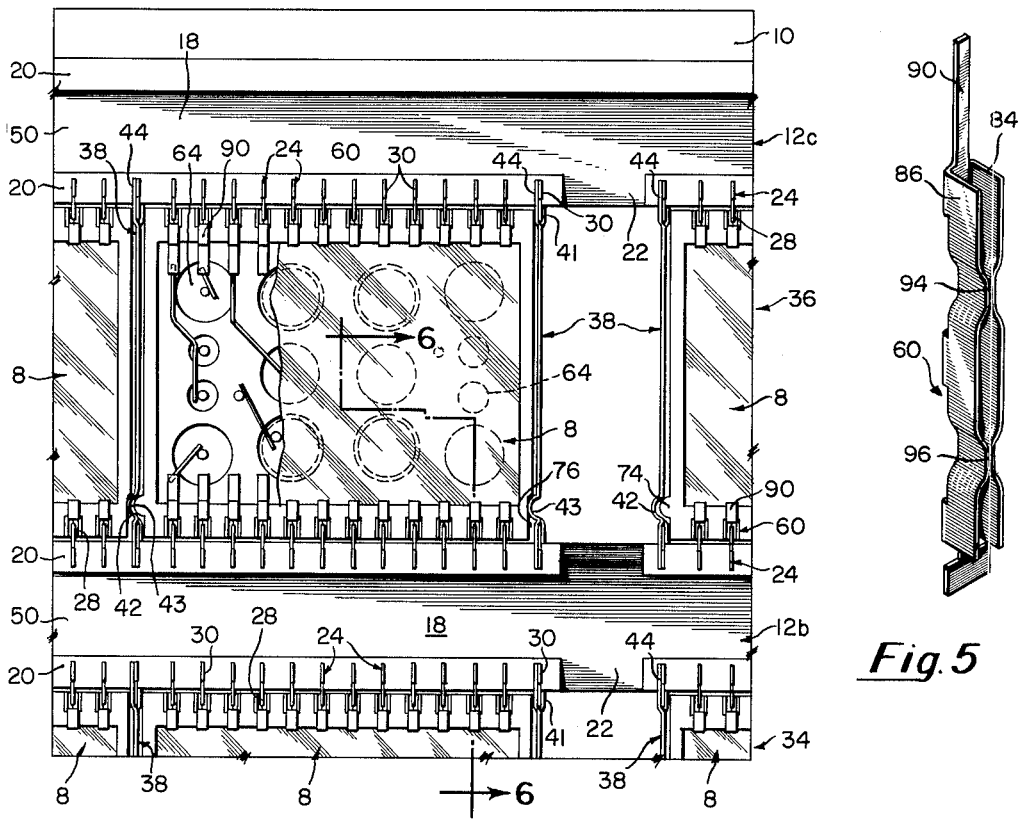
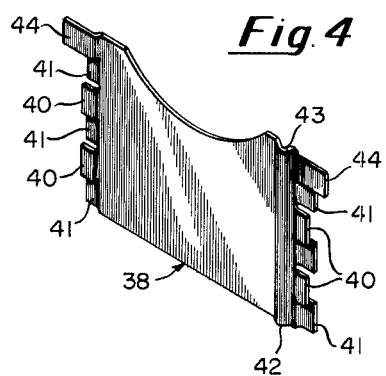
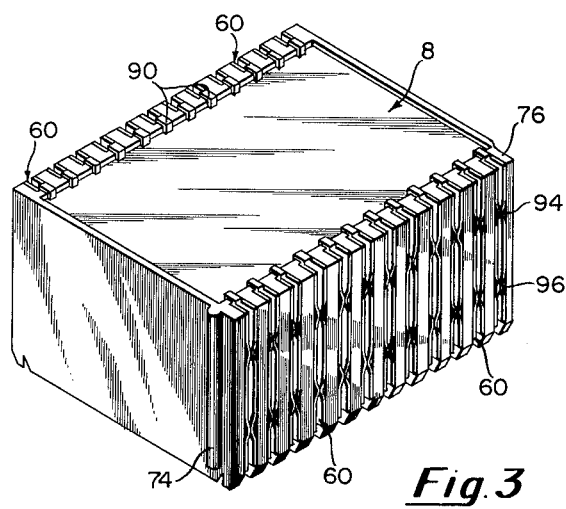
Fig. 2
Fig. 5
Fig. 4
Fig. 3
INVENTOR.
JOHN PARSTORFER
BY
Samuel Kane
ATTORNEY Jan. 4, 1966     J. PARSTORFER     3,227,927
ELECTRICAL RECEPTACLE Filed Aug. 15, 1960     3 Sheets-Sheet 3

INVENTOR.
JOHN PARSTORFER
BY
Samuel Kane
ATTORNEY

United States Patent Office 3,227,927
Patented Jan. 4, 1966

3,227,927
ELECTRICAL RECEPTACLE
John Parstorfer, Philadelphia, Pa., assignor to Burroughs Corporation, Detroit, Mich., a corporation of Michigan
Filed Aug. 15, 1960, Ser. No. 49,634
7 Claims. (Cl. 317—101)

This invention relates generally to electrical and electronic apparatus and more particularly to electrical receptacle structures and associated components. While the invention is not limited thereto, it finds special application in the fabrication of electronic computers.

The invention represents a new and novel modification of the receptacle structure and associated apparatus disclosed and claimed in a copending application of John Parstorfer and Edgar O. Sprude entitled "Electrical Network Assemblies," Serial No. 15,920, filed March 18, 1960, and assigned to the same assignee as the present invention.

Occasionally it is required to manufacture a single electrical structure, such as a computer, for example, in the shortest possible time and at minimum cost. This requirement has heretofore been difficult to meet because of complex circuitry and intricate wiring which are characteristic of computers.

An object of the invention therefore is to provide an improved receptacle structure and associated apparatus by means of which an electrical assembly, such as a computer, for example, may be constructed in a more rapid and simple manner than has heretofore been possible.

Another object of the invention is to provide a receptacle structure utilizing parts which may be standardized and which may readily be modified to suit a particular requirement, if necessary, by simple changes in construction or arrangement.

Another object of the invention is to provide a novel electrical structure or receptacle of modular design adapted for plug-in connection with one or more electrical modules each of which may carry a number of electrical components.

A further object of the invention is to provide a variable receptacle structure of modular design which may readily be adapted for plug-in connection to accommodate a preselected number of electrical modules of different sizes and of substantially standard external configuration.

Still a further object of the invention is to provide such a structure which is adaptable not only to one-unit production of an electrical apparatus, but also to quantity manufacture of such apparatus involving mass production techniques.

Another object of the invention is to provide an electrical structure which will facilitate the development of prototype models of electrical apparatus by enabling the usual changes during such a development to be made in a rapid and simple manner.

In accordance with the above objects and considered first in its broad aspects, the invention comprises a novel receptacle structure divided into compartments into which plug-in modules containing electrical components are received. The receptacle structure is preferably formed with routing means for electrical wire conductors so that the conductors may be arranged most efficiently and in compatibility with the electrical assembly in which the receptacle is used.

The invention will be more clearly understood when the following detailed description of specific embodiments thereof is read in conjunction with the accompanying drawings in which:

FIG. 2 is an enlarged plan view of a fragmentary portion of FIG. 1 showing an electrical module plugged into one of the receptacles;

FIG. 3 is an isometric view of one of the electrical modules;

FIG. 4 is an isometric view of one of a number of similar barriers or divider members;

FIG. 5 is an enlarged isometric view of one of a number of similar spring contacts showing the spring contact before it is assembled to an electrical module;

Figure 1:
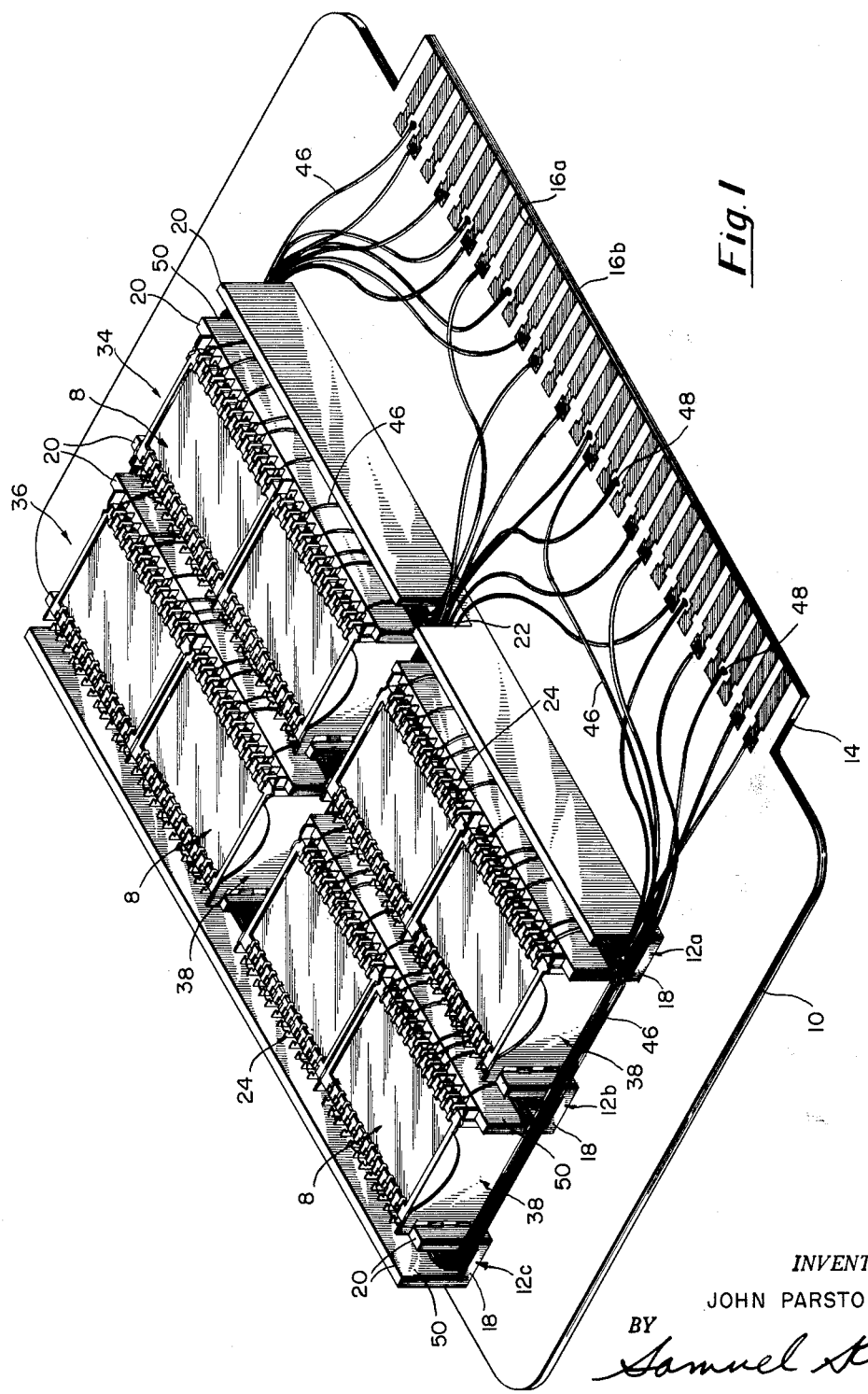
FIG. 1 is an isometric view of an electrical network assembly incorporating a plurality of electrical receptacles each constructed in accordance with the invention.

The electrical network assembly shown in FIG. 1 comprises a base or supporting panel 10 and a plurality of electrically insulating contact bars 12, designated 12a, 12b and 12c respectively, constructed preferably of a material adapted for manufacture by molding techniques.

The panel 10 is provided along a margin 14 with a row of parallel printed circuit conductors 16a on the upper surface of the panel and a corresponding row of parallel conductors 16b, not shown, on the under side of the panel. By means of the conductors 16a and 16b the panel 10 is adapted for plug-in connection into associated electrical apparatus, not shown, in accordance with well-known practice.

Figure 6:
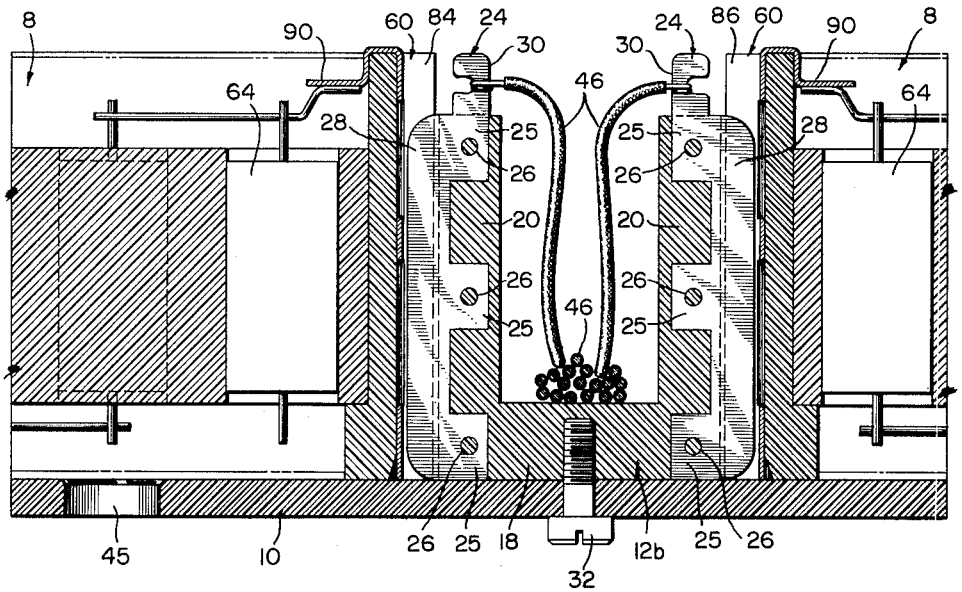
FIG. 6 is an enlarged vertical sectional view taken along line 6—6 of FIG. 2.

The contact bars 12 are similarly constructed of a channel or U-shape cross-section, as shown most clearly in FIG. 6, and each comprises a base 18 and upwardly extending legs 20. The legs 20 are provided with transverse openings therethrough preferably in the form of slots 22 (FIGS. 1 and 2). In the illustrated assembly, an opening or slot 22 has been omitted from the outer leg 20 of the contact bar 12c.

Projecting from the outside faces of the legs 20 of the contact bar 12b and from the outside face of the inner leg 20 of the contact bars 12a and 12c are a plurality of spaced-apart electrically conductive knife contacts 24 (FIG. 6) secured to the respective contact bars. Each contact bar 12 together with the knife contacts 24 thereon is preferably a molded assembly and for such purpose the knife contacts are provided with locking portions 25 having apertures 26 therethrough for anchoring the knife contacts 24 to the contact bars 12. The knife contacts 24 are constructed of thin, flat sheet metal and each comprises an elongated contact blade 28 integral with the locking portions 25 and a terminal or connecting portion 30 extending from the upper locking portion 25.

The contact bars 12 are arranged on the panel 10 in spaced-apart parallel relation (FIG. 1) and suitably secured to the panel as by cap screws 32 (FIG. 6). As so arranged, each adjacent pair of contact bars 12, such as bars 12a and 12b, or bars 12b and 12c, together with the knife contacts 24 on their confronting legs 20, constitutes an electrical receptacle 34 or 36 respectively, for plug-in reception of electrical modules 8 (FIGS. 1 and 3). The electrical receptacles 34 and 36 may also be regarded as including the barrier plates or dividers 38 (FIG. 4) associated therewith, these latter members to be described shortly hereafter.

The electrical modules 8 (FIG. 3) and the spring contacts 60 thereon (see also FIG. 5) are similarly identified and fully described in the above-mentioned Parstorfer-Sprude application, but form no part of the present invention and will therefore be described hereinafter only in such detail as is considered adequate to an understanding of the present invention.

As shown in FIG. 1, each receptacle 34 and 36 is illustratively provided with a row of four electrical modules 8 plugged thereinto and a suitable number of the barrier plates or dividers 38, mentioned above, which provide the receptacle into the required number of modular compartments each containing one of the electrical modules 8. As will appear more clearly hereinafter, the compartments may be varied in size merely by suitably positioning the dividers 38 in the respective receptacles for accommodating modules 8 of different lengths. It is understood that the contact bars 12 may be of any desired length to accommodate more or less electrical modules 8 in any particular assembly. It is also understood that more or less contact bars 12 may be provided in any particular case, but not less than two, to suit the requirements. Also, as shown in FIG. 1, the knife contacts 24 may be omitted from the outer legs 20 of the endmost contact bars, such as the bars 12a and 12c, if desired.

The dividers 38 (FIG. 4) are somewhat similar to the diivders described in the Parstorfer-Sprude application identified therein by the numeral 26, and are similarly preferably of one-piece construction of thin, flexible sheet material such, for example, as brass. Each divider 38 is provided with laterally extending alternately staggered ears 40 and 41. The spacing between each column of ears 40 and its adjacent column of ears 41 is substantially the same as the thickness of a knife contact 24. Along one of the columns of ears 40 and 41 is an elongated orienting ridge or offset 42 which forms on the opposite face of the divider 38 a concave recess 43. At the upper end of each divider 38 are laterally extending connecting ears 44 of greater length than the ears 40 or 41 and which lie in the same plane as the ears 40.

The dividers 38 are inserted or plugged into the receptacles 34 and 36 (FIGS. 1 and 2) with the ears 40 and 41 of each divider 38 straddling the blades 28 of opposite knife contacts 24 on confronting legs 20 of adjacent contact bars 12, and with the connecting ears 44 adjacent to one side of the terminal portions 30 of the associated knife contacts. The connecting ears 44 may then be soldered or otherwise secured to the terminal portions 30 thus to secure the dividers 38 in the receptacles. As shown in FIGS. 1 and 2, the dividers 38 are spaced apart to accommodate the particular length of electrical modules 8.

The electrical modules 8 are plugged into the receptacles 34 and 36, each between adjacent dividers 38, with the spring contacts 60 straddling the knife contact blades 28 and the dimpled regions 94 and 96 of the spring contacts 60 exerting a spring contact force on the blades, thus to place the electrical components 64 of the modules 8 (FIGS. 2 and 6) in circuit with the knife contacts 24. The electrical components 64 may include resistors, diodes, capacitors, transistors, etc.

Each electrical module 8 (FIG. 3) is provided with an elongated orienting ridge 74 and an elongated step or recess 76. As each module 8 is plugged into its respective receptacle 34 or 36, it is first oriented by aligning its ridge 74 with the recess 43 of one divider 38 and its recess 76 with the offset 42 of the adjacent divider.

The panel 10 is preferably provided with openings 45 (FIG. 6), one for each electrical module 8, for inserting an ejecting tool, not shown, for facilitating removal of the modules from the receptacles, if desired.

The knife contacts 24, except those which are used for securing the dividers 38, are electrically connected to the conductors 16a and 16b (FIG. 1) by means of conductor wires 46 certain of which have one end soldered or otherwise connected to conductors 16a and others of which pass through apertures 48 in the panel 10 to have one end similarly soldered or otherwise connected to conductors 16b. The conductor wires 46 lead from the conductors 16a and 16b to be routed into and along an appropriate channel 50 of a contact bar 12 between its legs 20 to have their other end portions soldered or otherwise connected to the terminal portions 30 (FIG. 6) of the knife contacts 24. The conductor wires 46 may be routed into the particular channels 50 either through the ends of the contact bars 12 or through the transverse openings or slots 22 in the bars.

Figure 7:
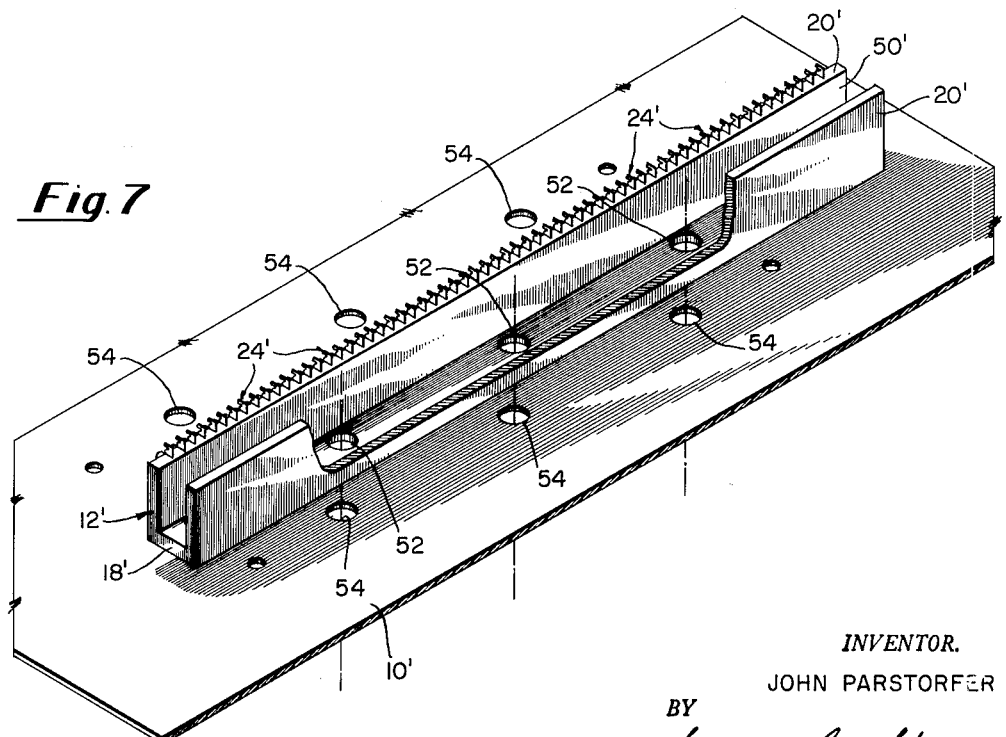
FIG. 7 shows an isometric exploded or separated view of a modification of a contact bar and supporting panel.

A modification 12' of the contact bars is shown in FIG. 7 in which the transverse openings or slots 22 are omitted and instead the base 18' provided with suitably spaced openings or holes 52 extending therethrough. The base or supporting panel 10' is similarly provided with openings or holes 54 extending therethrough in line with the holes 52. This modification provides an alternate method for routing the conductor wires 46 so that some or all of the wires may be placed on the under side of the panel 10' and routed upwardly through the holes 54 in the panel and the holes 52 in the contact bar 12' and thence along the channel 50' to the respective knife contacts 24' for connection of their end portions.

The modified contact bar 12' is illustrated as an endmost contact bar in which the knife contacts 24' have preferably been omitted from one of the legs 20', similar to the contact bars 12a and 12c (FIG. 1), however, if used as an intermediate contact bar such as the bar 12b it would be provided with knife contacts 24' on both legs 20'.

While there have been disclosed specific structures exemplary of the principles of the invention, it is to be understood that these are but one form and modification thereof and that the invention may be constructed in a variety of shapes, sizes and modifications without departing from the true spirit and scope thereof. Accordingly, it is to be understood that the invention is not to be limited by the specific structures disclosed but only by the subjoined claims.

What is claimed is:

1. In an electrical network assembly having a panel, an electrical plug-in module, and electrical contacts on said module, a receptacle for said module comprising, two elongated bars of electrically insulating material secured to said panel in spaced-apart parallel relation, each bar comprising a base member adjacent to said panel and parallel legs extending from said base member normal to said panel, the legs of each bar being spaced apart to enable conductor wires to be routed therebetween and forming with the respective base member a three-sided open channel, a leg of each bar confronting a leg of the other bar, and electrically conductive elements contiguous to adjacent faces of said confronting legs for contacting the electrical contacts on said module, each said electrically conductive element having locking means anchoring it to one of said bars and said locking means being external to the channel of the associated bar.

2. In an electrical network assembly having a panel, an electrical plug-in module, and spring contacts on said module, a receptacle for said module comprising, two elongated bars secured to said panel in spaced-apart parallel relation, each bar comprising a base member adjacent to said panel and parallel legs extending from said base member normal to said panel, the legs of each bar being spaced apart to form with the respective base member a three-sided open channel for routing conductor wires, a leg of each bar confronting a leg of the other bar, and a plurality of knife contacts projecting from adjacent faces of said confronting legs for contacting the spring contacts on said module, each said knife contact having locking means anchoring it to the associated confronting leg and said locking means being external to the channel of the bar containing said confronting leg.

3. A receptacle according to claim 2 wherein each knife contact is provided with a terminal portion for connecting an associated electrical element.

4. In an electrical network assembly having a panel, electrical plug-in modules, and electrical contacts on said modules, a receptacle for said modules comprising, two elongated bars secured to said panel in spaced-apart relation, each bar comprising a base member adjacent to said panel and parallel legs extending from said base member normal to said panel, the legs of each bar being spaced apart to form with the respective base member a three-sided open channel for routing conductor wires, a leg of each bar confronting a leg of the other bar, a plurality of knife contacts secured to said bars and having blade portions contiguous to adjacent faces of said confronting legs for contacting the electrical contacts on said modules, and divider members of substantially rectangular shape each having opposite edge portions in locking engagement respectively with the blade portion of a knife contact on each of said bars, said divider members defining with said bars modular compartments each adapted for plug-in reception of one of said modules.

5. A receptacle according to claim 4 wherein each knife contact is provided with a terminal portion for connecting an associated electrical element and said divider members are each connected to said terminal portion of at least one of its associated knife contacts.

6. In an electrical network assembly having electrical plug-in modules and electrical contacts on said modules, apparatus comprising, a panel having at least one opening extending therethrough, two elongated bars secured to a side of said panel in spaced-apart relation, each bar comprising a base member adjacent to said panel and legs extending from said base member forming a three-sided open channel therewith for routing conductor wires, at least one of said base members having an opening communicating with its associated channel and said panel opening for routing conductor wires into said associated channel from the opposite side of said panel, a leg of one bar being parallel to and confronting a leg of the other bar, a plurality of knife contacts secured to said bars and having blade portions normal to adjacent faces of said confronting legs for contacting the electrical contacts on said modules, and plug-in divider members of substantially rectangular shape each having opposite edge portions in straddling engagement respectively with a said blade portion of a knife contact on each of said bars, said divider members defining with said parallel legs modular compartments each adapted for plug-in reception of one of said modules.

7. In an electrical network assembly having a panel, electrical plug-in modules and electrical spring contacts on said modules, apparatus comprising, a plurality of elongated bars of electrically insulating material secured to said panel in spaced-apart tandem relation, said plurality of bars comprising two endmost bars and at least one intermediate bar, each two adjacent bars establishing a base receptacle structure for plug-in reception of a row of said modules, each bar comprising a base member and parallel legs extending from said base member, the legs of each bar being spaced apart to enable conductor wires to be routed therebetween and along at least one of said rows of said modules and forming with the respective base member a three-sided open channel, a leg of each bar being parallel to and confronting a leg of an adjacent bar, an intermediate bar and at least one endmost bar having mutually aligned transverse openings therein for routing conductor wires through at least one of said rows of modules, a plurality of knife contacts secured to said bars and having blade portions normal to and between adjacent faces of said confronting legs for contacting said spring contacts on said modules, each said bar and its associated knife contacts being provided with means molding them together as a unit, and plug-in divider members of substantially rectangular shape each having opposite edge portions in straddling engagement respectively with a said blade portion of a knife contact on adjacent bars, each of said divider members having at least one connecting portion for securing the same in said straddling engaged position, said divider members defining with said confronting legs of adjacent bars modular compartments each containing a number of said blade portions and adapted for plug-in reception of one of said modules.

References Cited by the Examiner
UNITED STATES PATENTS

| | | | |
|---|---|---|---|
| 1,324,161 | 12/1919 | Krantz | 174—52 |
| 1,829,109 | 10/1931 | Pohu | 317—101 |
| 1,837,962 | 12/1931 | Hensgen | 317—101 |
| 2,799,837 | 7/1957 | Powell | 317—101 |
| 2,834,922 | 5/1958 | Selgin | 317—101 |
| 2,889,493 | 6/1959 | Scal | 317—101 |
| 2,907,926 | 10/1959 | Slack | 317—101 |
| 2,977,512 | 3/1961 | Sinner | 317—101 |

OTHER REFERENCES

Electronic Design; March 16, 1960, pages 126 and 127.

KATHLEEN H. CLAFFY, *Primary Examiner.*

SAMUEL BERNSTEIN, JOHN F. BURNS, *Examiners.*